(12) United States Patent
Akkad et al.

(10) Patent No.: US 10,843,225 B2
(45) Date of Patent: Nov. 24, 2020

(54) METHOD FOR ENHANCING RESISTANCE TO DELAMINATION OF A COATING LAYER APPLIED TO A RIGID, MONOLITHIC SUBSTRATE

(71) Applicants: Manoj Harilal Akkad, Mumbai (IN); Vipin Vithalbhai Patel, Ankleshwar (IN)

(72) Inventors: Manoj Harilal Akkad, Mumbai (IN); Vipin Vithalbhai Patel, Ankleshwar (IN)

(*) Notice: Subject to any disclaimer, the term of this patent is extended or adjusted under 35 U.S.C. 154(b) by 370 days.

(21) Appl. No.: 15/626,924

(22) Filed: Jun. 19, 2017

(65) Prior Publication Data
US 2017/0368571 A1    Dec. 28, 2017

(30) Foreign Application Priority Data

Jun. 23, 2016 (IN) .............................. 201621021643

(51) Int. Cl.
*B32B 3/24* (2006.01)
*B05D 5/00* (2006.01)
(Continued)

(52) U.S. Cl.
CPC .............. *B05D 5/00* (2013.01); *B05D 3/002* (2013.01); *B05D 7/14* (2013.01); *C09D 127/18* (2013.01);
(Continued)

(58) Field of Classification Search
CPC ..... Y10T 428/24347; Y10T 428/24339; B32B 3/266; B05D 5/086; B05D 5/083
See application file for complete search history.

(56) References Cited

U.S. PATENT DOCUMENTS

| | | | |
|---|---|---|---|
| 3,932,249 A | * | 1/1976 | Jury ........................ B29C 70/26 156/213 |
| 4,004,774 A | | 1/1977 | Houston |

(Continued)

FOREIGN PATENT DOCUMENTS

| | | |
|---|---|---|
| CN | 203718248 U | 7/2014 |
| WO | 94/05873 A1 | 3/1994 |

OTHER PUBLICATIONS

M. Lisicins et al. Conversion of Polymer and Perforated Metallic Residues into New Value-added Composite Building Materials, Energy Procedia 72, 2015, 148-155, www.sciencedirect.com.
(Continued)

*Primary Examiner* — William P Watkins, III
(74) *Attorney, Agent, or Firm* — The Roy Gross Law Firm, LLC; Roy Gross (57) ABSTRACT

The present disclosure provides a method for enhancing resistance to delamination of a coating layer applied to a rigid, monolithic substrate (204, 404). The method comprises forming a plurality of holes (208, 408) on the substrate (204, 404), to define passages from a first operative surface to a second operative surface of the substrate (204, 404). The first operative surface is coated with a first coating material and the second operative surface is coated with a second coating material, to obtain a first operative surface having a first coating layer (202, 402), and a second operative surface having a second coating layer (206, 406). A portion of the first coating material and/or the second coating material is allowed to flow through the passages to configure contiguous ties (210, 410) between the first and the second coating layer. The contiguous ties formed between the first and the second coating layer aid in enhancing the resistance to delamination of the coating layer applied to the rigid, monolithic substrate (204, 404).

8 Claims, 5 Drawing Sheets

US 10,843,225 B2
Page 2

(51) Int. Cl.
- B05D 7/14 (2006.01)
- B05D 3/00 (2006.01)
- C09D 127/18 (2006.01)
- C09D 129/10 (2006.01)
- B32B 3/26 (2006.01)
- B05D 5/08 (2006.01)

(52) U.S. Cl.
CPC ............ C09D 129/10 (2013.01); *B05D 5/083* (2013.01); *B05D 5/086* (2013.01); *B05D 2202/10* (2013.01); *B05D 2252/10* (2013.01); *B32B 3/266* (2013.01); *Y10T 428/24339* (2015.01); *Y10T 428/24347* (2015.01)

(56) References Cited

U.S. PATENT DOCUMENTS

| | | | |
|---|---|---|---|
| 4,283,464 A | 8/1981 | Hascoe | |
| 4,766,024 A | 8/1988 | Nath et al. | |
| 4,835,034 A | 5/1989 | Cruz | |
| 4,913,951 A * | 4/1990 | Pitolaj | B29C 43/027 428/76 |
| 5,011,655 A | 4/1991 | Mankins | |
| 5,074,040 A * | 12/1991 | Nisley | F16C 23/084 29/898.066 |
| 5,112,683 A | 5/1992 | Johansen | |
| 5,172,920 A | 12/1992 | Schlenk | |
| 5,672,405 A | 9/1997 | Plank, Jr. et al. | |
| 6,808,155 B2 | 10/2004 | Anthony | |
| 6,815,022 B2 | 11/2004 | Renck et al. | |
| 7,416,789 B2 | 8/2008 | Breit et al. | |
| 7,771,813 B2 | 8/2010 | Akishev et al. | |
| 2006/0137757 A1* | 6/2006 | McKeen | B32B 7/12 138/145 |
| 2010/0068108 A1* | 3/2010 | Devic | B82Y 30/00 422/241 |
| 2010/0133150 A1* | 6/2010 | Chakrabarty | B08B 17/02 208/390 |
| 2011/0020599 A1 | 1/2011 | Le Roy et al. | |

OTHER PUBLICATIONS

Fluoroshield GSC-M Coating, edlon-fgscmc, 2016.
Voght GSC MS Data Sheet, 2010.
S.T. Amancio-Filho et al. Joining of polymers and polymer—metal hybrid structures Recent developments and trends, Polymer Engineering and Science, 1476, 2009.

* cited by examiner

METHOD FOR ENHANCING RESISTANCE TO DELAMINATION OF A COATING LAYER APPLIED TO A RIGID, MONOLITHIC SUBSTRATE

FIELD

The present disclosure relates to a method for enhancing resistance to delamination of a coating layer applied to a substrate.

Definitions

As used in the present disclosure, the following terms are generally intended to have the meaning as set forth below, except to the extent that the context in which they are used indicates otherwise.

Dry film thickness (DFT): The term "dry film thickness" refers to the thickness of a coating as measured above the substrate. This can consist of a single layer or multiple layers. DFT is measured for fully cured coatings.

Delamination: The term "delamination" refers to the separation of a film of a coating from a substrate due to the loss of adhesion over a significant area.

Contiguous tie: The term "contiguous tie" refers to the bridge/connection formed between two layers of the coating that are capable of resisting delamination.

Rigid, monolithic substrate: The term "rigid, monolithic substrate" refers to non-flexible substrates that are present in the form of a single unit.

BACKGROUND

Coatings are a combination of ingredients that are applied to substrates, such as metal, plastic, wood, plywood, concrete, and fiberglass, to protect the substrate from the damaging effects of the environment, and corrosive materials. These substrates can be used in the construction of bridges, ships, chemical tanks, refineries, buildings or pipelines. The most commonly used substrate is metal, which can be used for the construction of articles, such as pipes, containers, tanks, reactors, and vessels which may carry or contain corrosive ingredients. To safeguard/protect these articles, they are lined inside with a coating to prevent contact of the corrosive material with the metal. Typically, polymeric coatings are applied to prevent the corrosion of the substrates.

Even though, there are a large number of polymeric coatings with increased resistance to permeation, none of them are impervious and over a period of time, the corrosive material may permeate through the coatings. This may bring the corrosive material in direct contact with the metal substrate. As the corrosive material continues to permeate through the coating (or seep along the metal), they will attack the bond between the primer and the metal substrate, thereby causing debonding between the coating and the metal substrate. This results in the formation of bubbles in/behind the coating and ultimately leads to the delamination of a substantial area of the coating film over a period of time.

Various attempts have been made to slow down the permeation in order to prevent delamination. One method to curb the permeation of the corrosive material through the coating is by adding fillers which decrease the permeability of the coating. Though, the fillers decrease the rate of permeation (permeability) of the coating, they may not show adequate resistance to the corrosive material and may get attacked by them. Another method to protect the substrate is to provide a thick lining to the substrate, by using an adhesive between the lining and the substrate. However, when permeation takes place, the corrosive material may attack the adhesive and result in delamination of the lining. Another method involves the welding of a wire mesh inside the wall of the metal container and spraying the coating onto the wire mesh. The welded wire mesh prevents the coating from delaminating. However, the coating behind the wire mesh may not completely cover the wires due to the nature of the construction of the wire mesh. Hence, those areas of wire mesh may be vulnerable to chemical attack.

Further, U.S. Pat. No. 6,808,155 suggests an apparatus of lay-up mold that can form a composite article comprising a supporting framework and a plurality of spaced apart perforated steel sheets coated with a polymeric material. A coating of polyurethane is overlaid and bonded to and interlocked with the perforated steel sheet. U.S. Pat. No. 6,815,022 suggests laminated structures constructed from adhesively joined sheet material layers reinforced by adhesive bridges that extend through openings in the layer and tie together the layers on either side of the reinforced layer. US20110020599 suggests a composite panel comprising two fibrous layers and a web placed in the inner volume between the layers and bonded to the latter by a solidified bonding material. However, none of these documents disclose a method for enhancing the resistance to delamination of coating applied to a substrate.

Hence, there is felt a need to develop a method to enhance the resistance to delamination of a coating from a substrate.

Objects

Some of the objects of the present disclosure, which at least one embodiment herein satisfies, are as follows:

An object of the present disclosure is to ameliorate one or more problems of the prior art or to at least provide a useful alternative.

Another object of the present disclosure is to provide a method for enhancing resistance to delamination of a coating layer applied to a rigid, monolithic substrate.

Still another object of the present disclosure is to provide an article which has enhanced resistance to delamination of a coating layer applied to it.

Other objects and advantages of the present disclosure will be more apparent from the following description, which is not intended to limit the scope of the present disclosure.

SUMMARY

The present disclosure relates to a method for enhancing resistance to delamination of a coating layer applied to a substrate. The substrate has a first operative surface and a second operative surface. The method comprises providing a rigid, monolithic substrate and forming a plurality of holes on the substrate to define passages from the first operative surface to the second operative surface. The first operative surface is coated with a first coating material to obtain a first coating layer and the second operative surface is coated with a second coating material to obtain a second coating layer. A portion of the first coating material and/or second coating material is made to flow through the passages to configure contiguous ties between the first coating layer and the second coating layer. The contiguous ties formed between the first coating layer and the second coating layer aid in enhancing the resistance to delamination of the coating layer applied to the substrate. In an embodiment, the holes are uniformly dispersed throughout the body of the substrate. In another embodiment, holes are randomly dispersed throughout the body of the substrate.

The present disclosure further provides an article comprising a rigid, monolithic substrate having a first operative surface and a second operative surface, and a plurality of holes formed thereon to define passages from the first operative surface to the second operative surface. A first coating material is applied onto the first operative surface and a second coating material is applied onto the second operative surface, to form a first coating layer and a second coating layer, respectively, while a portion of the first coating material and/or the second coating material is made to flow through the passages and configure contiguous ties between the first coating layer and the second coating layer.

BRIEF DESCRIPTION OF ACCOMPANYING DRAWING

The process of the present disclosure will now be described with the help of the accompanying drawing, in which.

The table below lists the numerals used in the drawing and their nomenclature.

| Numeral | Nomenclature |
| --- | --- |
| 100 | Coated carbon steel plate without holes |
| 102 | First coating layer |
| 104 | Carbon steel substrate |
| 106 | Second coating layer |
| 200 | Coated carbon steel plate with holes |
| 202 | First coating layer |
| 204 | Carbon steel substrate |
| 206 | Second coating layer |
| 208 | Through hole |
| 210 | Contiguous ties formed between the first coating layer and the second coating layer |
| 300 | Coated carbon steel tube without holes |
| 302 | First coating layer |
| 304 | Carbon steel substrate |
| 306 | Second coating layer |
| 400 | Coated carbon steel tube with holes |
| 402 | First coating layer |
| 404 | Carbon steel substrate |
| 406 | Second coating layer |
| 408 | Through hole |
| 410 | Contiguous ties formed between the first coating layer and the second coating layer |
| 500 | Stainless steel tank |
| T1 | Area with holes formed on the walls of the tank |
| T2 | Area without holes formed on the walls of the tank |
| A | Blown up image of the area having holes, with the contiguous ties formed between the first coating layer and the second coating layer |
| B | Through hole |
| C | Contiguous ties formed between the first coating layer and the second coating layer |
| D | First coating layer |
| E | Second coating layer |

DETAILED DESCRIPTION

Coatings are a combination of ingredients that are applied to substrates, such as metal, plastic, wood, plywood, concrete, and fiberglass, to protect the substrate from the damaging effects of the environment, and corrosive materials. Typically, polymeric coatings are applied to prevent the corrosion of the substrates. However, the polymeric coatings are not impervious and over a period of time, the corrosive material permeates through the coatings, causing loss of the bonding between the coating and the substrate, and ultimately leading to delamination of the coating.

Attempts to slow down the permeation in order to prevent the delamination, include use of fillers, providing a thick lining to the substrate by using an adhesive, and welding a wire mesh to the inside of the article. However, the fillers may not have adequate resistance to the corrosive material and may be attacked by the corrosive material. Further, when permeation takes place, the corrosive material may attack the adhesive and result in delamination of the thick lining. Still further, the coating behind the wire mesh may not completely cover the wires due to the nature of the construction of the wire mesh and further some of the wire mesh areas may not have enough coating material. Hence, those areas of wire mesh may be vulnerable to chemical attack.

The present disclosure envisages a method for enhancing resistance to delamination of a coating layer applied to a substrate, which mitigates the drawbacks mentioned hereinabove.

In an aspect of the present disclosure, there is provided a method for enhancing resistance to delamination of a coating layer applied to a substrate having a first operative surface and a second operative surface. In the first step, there is provided a rigid monolithic substrate. Next, a plurality of holes is formed on the substrate to define passages from the first operative surface to the second operative surface of the substrate.

In an embodiment of the present disclosure, the holes are uniformly dispersed throughout the body of the substrate In another embodiment of the present disclosure, the holes are randomly dispersed throughout the body of the substrate.

Typically, the substrate can be selected from the group consisting of metal, glass, plastic, fiber reinforced plastic, and composite of fiberglass. In one embodiment of the present disclosure, the rigid, monolithic substrate is a metal substrate.

In the next step, a first coating material is applied to the first operative surface and a second coating material is applied to the second operative surface of the substrate to obtain a first coating layer, and a second coating layer.

A portion of the first coating material and/or the second coating material is made to flow through the passages to configure contiguous ties between the first coating layer and the second coating layer, wherein the contiguous ties secures the coating layers, thereby resulting in enhanced resistance to delamination of the coating layers.

In accordance with the embodiments of the present disclosure, the first and the second coating layers independently have a dry film thickness in the range of 100 µm to 2000 µm. In accordance with an embodiment, the first and the second coating layers independently have a dry film thickness in the range of 200 µm to 1200 µm.

In one embodiment, the first coating material and the second coating material are same. In another embodiment, the first coating material and the second coating material are different.

In an embodiment, the first coating material and the second coating material are polymers. Typically, the polymer can be selected from the group consisting of fluoropolymers, epoxy resins, polyolefins, polyurethanes, silicones, alkyd resins, acrylics, polyesters, melamine resins, and phenol formaldehyde resins. In an embodiment of the present disclosure, the fluoropolymer is selected from the group consisting of perfluoroalkoxy resin, tetrafluoroethylene, ethylene tetrafluoroethylene, ethylene chlorotrifluoroethylene, polyvinylidene fluoride, polychlorotrifluoroethylene, and fluorinated ethylene propylene copolymers.

The present disclosure further provides an article comprising a rigid, monolithic substrate. The substrate has a first operative surface and a second operative surface; a plurality of holes formed thereon to define passages from the first operative surface to the second operative surface. A first coating material is applied onto the first operative surface and a second coating material is applied to the second operative surface, to form a first coating layer and a second coating layer, respectively. A portion of the first coating material and/or the second coating material is made to flow through the passages to configure contiguous ties between the first coating layer and the second coating layer.

When such a coating layer comes in contact with a corrosive material, the corrosive material, over a period of time, can permeate through the coating layer and can delaminate the coating layer from the substrate. However, the contiguous ties formed between the first coating layer and the second coating layer resists the delamination of the coating from the substrate.

Due to the plurality of holes, there are multiple contiguous ties, which form a strong connection between the first coating layer and the second coating layer. These contiguous ties aid in providing enhanced resistance to delamination to the coating layer applied to a rigid, monolithic substrate.

The method of the present disclosure can be applied on any rigid, monolithic substrate which forms a part of any article, such as tubes, cans, canisters, drums, barrels, shipping containers, tanks, chemical process equipment, and reaction vessels. In an embodiment of the present disclosure, the article is a pipe. In another embodiment, the article is a reaction vessel. In a further embodiment, the article is a tank.

The article comprising a rigid, monolithic substrate having a first operative surface and a second operative surface coated with the first coating material and the second coating material, respectively, in accordance with the present disclosure has enhanced resistance to delamination of the coating layers from the substrate. The method used in the present disclosure for enhancing resistance to delamination of a coating layer applied to a substrate is easy as compared to the conventional methods.

The present disclosure is further described in light of the following laboratory scale experiments which are set forth for illustration purpose only and not to be construed for limiting the scope of the disclosure. These laboratory scale experiments can be scaled up to industrial/commercial scale and the results obtained can be extrapolated to industrial/commercial scale.

EXPERIMENTAL DETAILS

In experiments 1 and 2, accelerated corrosion test was carried out, wherein the sides (outer edge) were left open for acid to seep through.

Figure 1A:
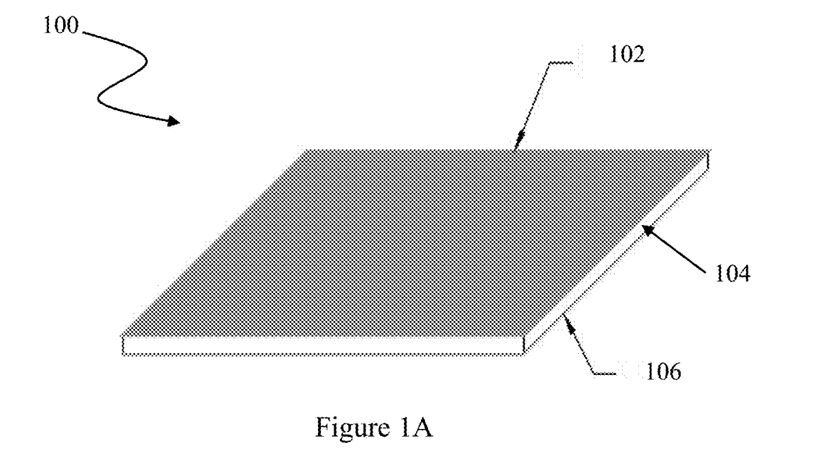
FIG. 1A illustrates a coated carbon steel plate without holes.
Figure 1B:
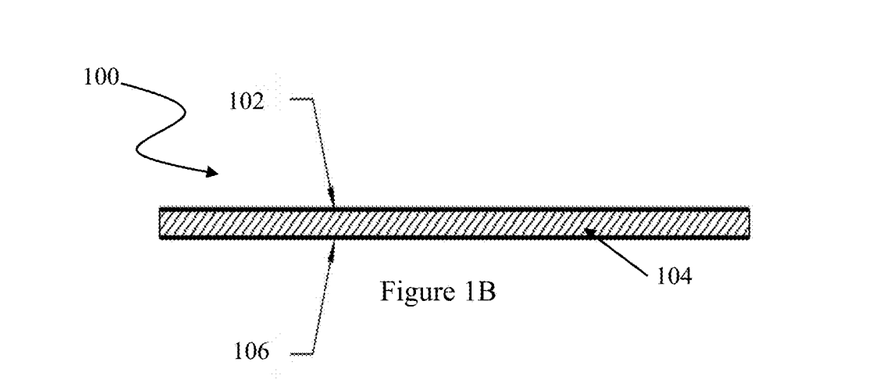
FIG. 1B illustrates a cross sectional view of a coated carbon steel plate without holes.

Experiment 1: Comparison of Resistance to Delamination of Carbon Steel Plate Prepared in Accordance with Present Disclosure and Conventionally Prepared Carbon Steel Plate Experiment 1A: Study of Resistance to Delamination of Conventionally Prepared Carbon Steel Plate A carbon steel plate was prepared, having a dimension of 150 mm length, 100 mm breadth and 2 mm thickness, without holes/perforations. The plate was grit blasted using standard processes, followed by coating of the first operative surface and the second operative surface with a coating material (PFA) to obtain a coated carbon steel plate (100) as illustrated in FIG. 1A, wherein (102) represents the first coating layer, (106) represents the second coating layer and (104) represents the carbon steel substrate, without holes. FIG. 1B illustrates a cross sectional view of the coated carbon steel plate without holes of FIG. 1A. The first coating layer and the second coating layer were then cured. The steps of coating and curing were repeated till 400 microns thick coating layers were built on either side of the plate. The plate (100) was then immersed in concentrated hydrochloric acid (HCl). The plate (100) was inspected periodically for corrosion. It was observed that HCl corroded the edges of the plate without the holes. Further, the acid had also seeped between the PFA coating and the metal substrate resulting in the corrosion of the substrate surface, and thereby leading to the loss of bond between the coating and the metal substrate, resulting in the delamination of the coating layer from the metal substrate, after the loss of adhesion due to corrosion.

Figure 2A:
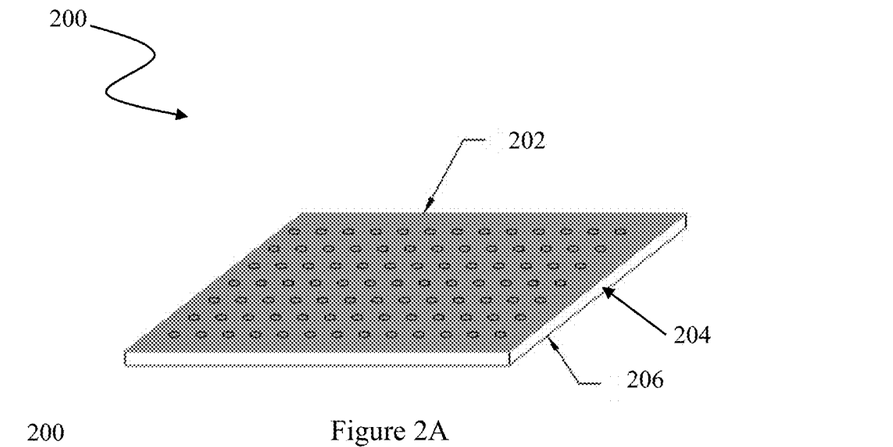
FIG. 2A illustrates a coated carbon steel plate with holes.
Figure 2B:
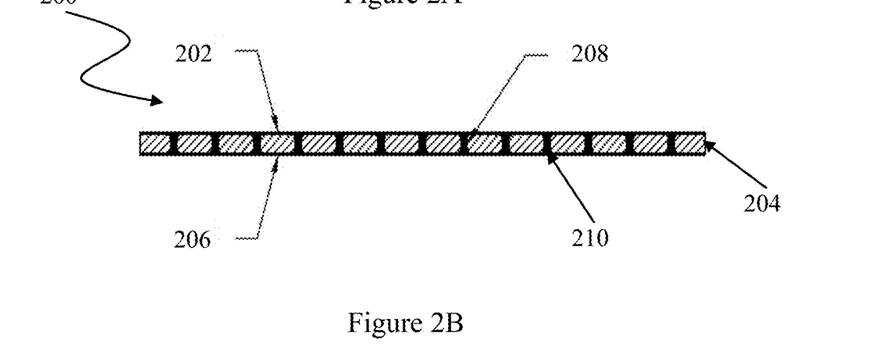
FIG. 2B illustrates a cross sectional view of a coated carbon steel plate with holes.

Experiment 1B: Study of Resistance to Delamination of Carbon Steel Plate Prepared in Accordance with the Present Disclosure Through holes of 2.5 mm diameter at 9 mm pitch were formed on a carbon steel plate having a dimension of 150 mm length, 100 mm breadth and 2 mm thickness. The plate was grit blasted, using standard processes, followed by coating of the first operative surface and the second operative surface with a coating material (PFA) to obtain an coated carbon steel plate (200), as illustrated in FIG. 2A, wherein (202) represents the first coating layer and (206) represents the second coating layer, (204) represents the carbon steel substrate, with holes, and. FIG. 2B illustrates a cross sectional view of a coated carbon steel plate (200) of FIG. 2A with through holes (208) displaying the contiguous ties (210) formed between the first coating layer (202) and the second coating layer (206). The first coating layer and the second coating layer were then cured. The steps of coating and curing were repeated till a 400 microns thick coating layers were built on either side of the plate. The coated carbon coated steel plate (200) was then immersed in concentrated hydrochloric acid (HCl). The plate was inspected periodically for corrosion. Though a loss of adhesion was observed, the coating layer was not delaminated from the substrate, the contiguous ties (210) were able to hold the coating layer close to the substrate, in spite of the loss of adhesion due to corrosion.

Figure 3A:
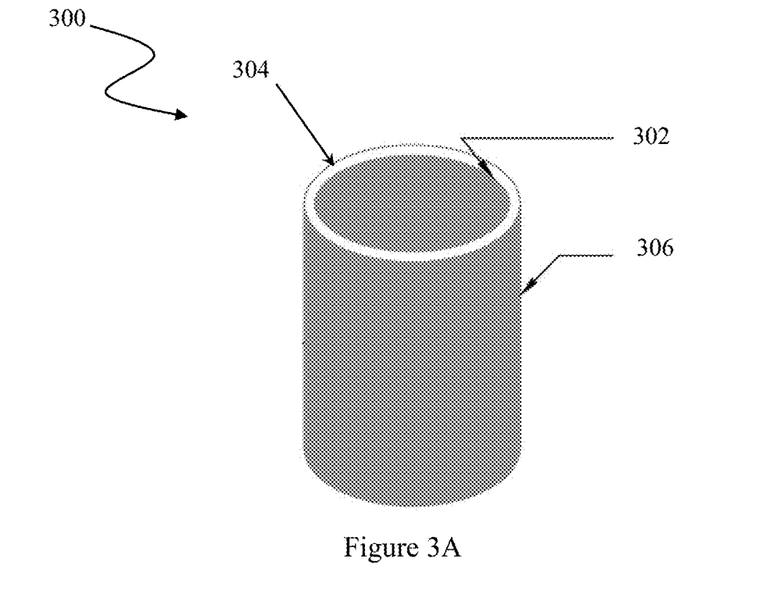
FIG. 3A illustrates a coated carbon steel tube without holes.
Figure 3B:
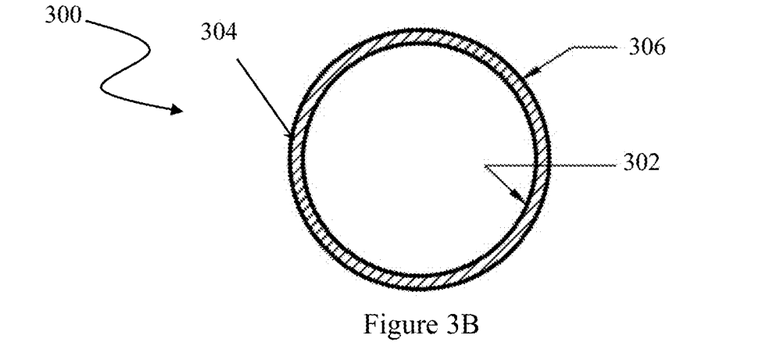
FIG. 3B illustrates a cross sectional view of a coated carbon steel tube without holes.

Experiment-2: Comparison of Resistance to Delamination of Carbon Steel Tube Prepared in Accordance with Present Disclosure and Conventionally Prepared Carbon Steel Tube Experiment-2A: Study of Resistance to Delamination of Conventionally Prepared Carbon Steel Tube A carbon steel tube was prepared, having 2 inches normal bore (NB) diameter and 100 mm height without holes/perforations. The first operative surface and the second operative surface of the tube were coated with a coating material: perfluoroalkoxy resin (PFA) to obtain a coated carbon steel tube (300). The coating layers had a thickness of 400 microns. FIG. 3A illustrates a coated carbon steel tube wherein (302) represents the first coating layer, (306) represents the second coating layer, and (304) represents the carbon steel substrate. FIG. 3B illustrates a cross sectional view of a coated carbon steel tube (300) without holes of FIG. 3A. The first coating layer and the second coating layer were then cured. The steps of coating and curing were repeated till 400 microns thick coating layers were built on either surface of the tube. The coated carbon steel tube (300) was then immersed in concentrated hydrochloric acid (HCl). The tube was inspected periodically for corrosion. It was observed that HCl corroded the edges of the tube without the holes. Further, the acid had also seeped between the PFA coating and the metal substrate resulting in the corrosion of the substrate surface, and thereby leading to the loss of bond between the coating and the metal substrate, resulting in the delamination of the coating layer from the metal substrate, after the loss of adhesion due to corrosion.

Figure 4A:
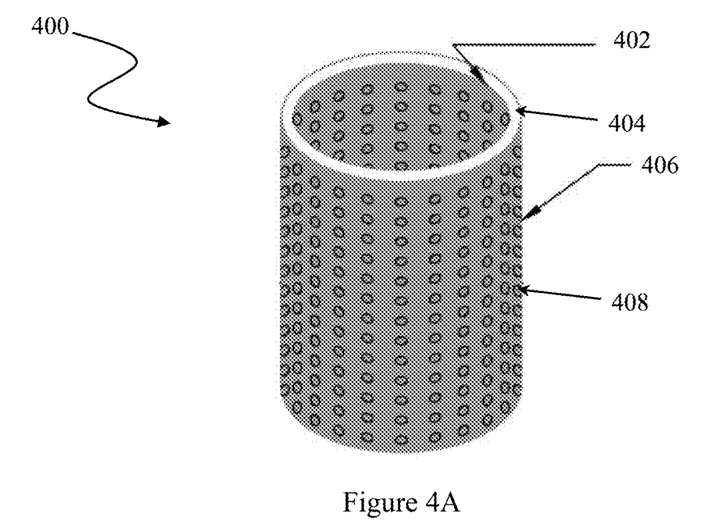
FIG. 4A illustrates a coated carbon steel tube with holes.
Figure 4B:
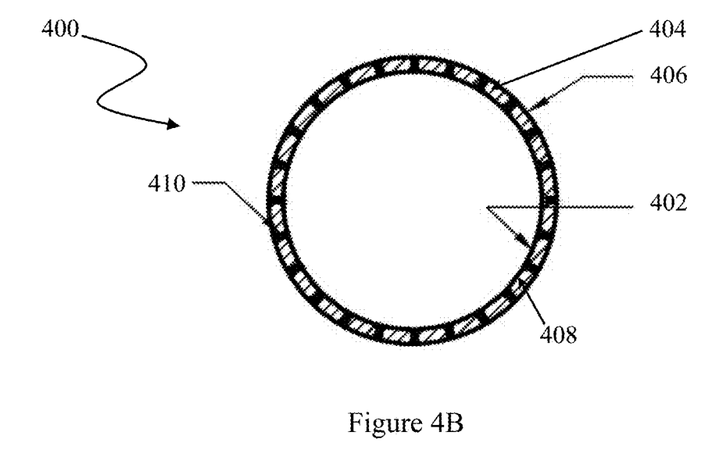
FIG. 4B illustrates a cross sectional view of a coated carbon steel tube with holes.

Experiment-2B: Study of Resistance to Delamination of Carbon Steel Tube Prepared in Accordance with the Present Disclosure Through holes having 2.5 mm diameter at 9 mm pitch were formed on a carbon steel tube, having 2 inches normal bore (NB) diameter and 100 mm height. The carbon steel tube was grit blasted, using standard processes, followed by coating of the first operative surface and the second operative surface with a coating material (PFA) to obtain a coated carbon steel tube (400), as illustrated in FIG. 4A, wherein (402) represents the first coating layer, (406) represents the second coating layer and (408) represents a through hole. FIG. 4B illustrates a cross sectional view of a coated carbon steel tube (400) with holes (408) of FIG. 4A displaying the contiguous ties (410) formed between the first coating layer and the second coating layer, and (404) represents the carbon steel substrate. The first coating layer and the second coating layer were then cured. The steps of coating and curing were repeated till a 400 microns thick coating layers were built on either side of the tube. The coated carbon steel tube (400) was then immersed in concentrated hydrochloric acid (HCl). The tube was inspected periodically for corrosion. Though a loss of adhesion was observed, the coating layer was not delaminated from the substrate. The contiguous ties (410) were able to hold the coating layer close to the substrate, in spite of the loss of adhesion due to corrosion.

Figure 5:
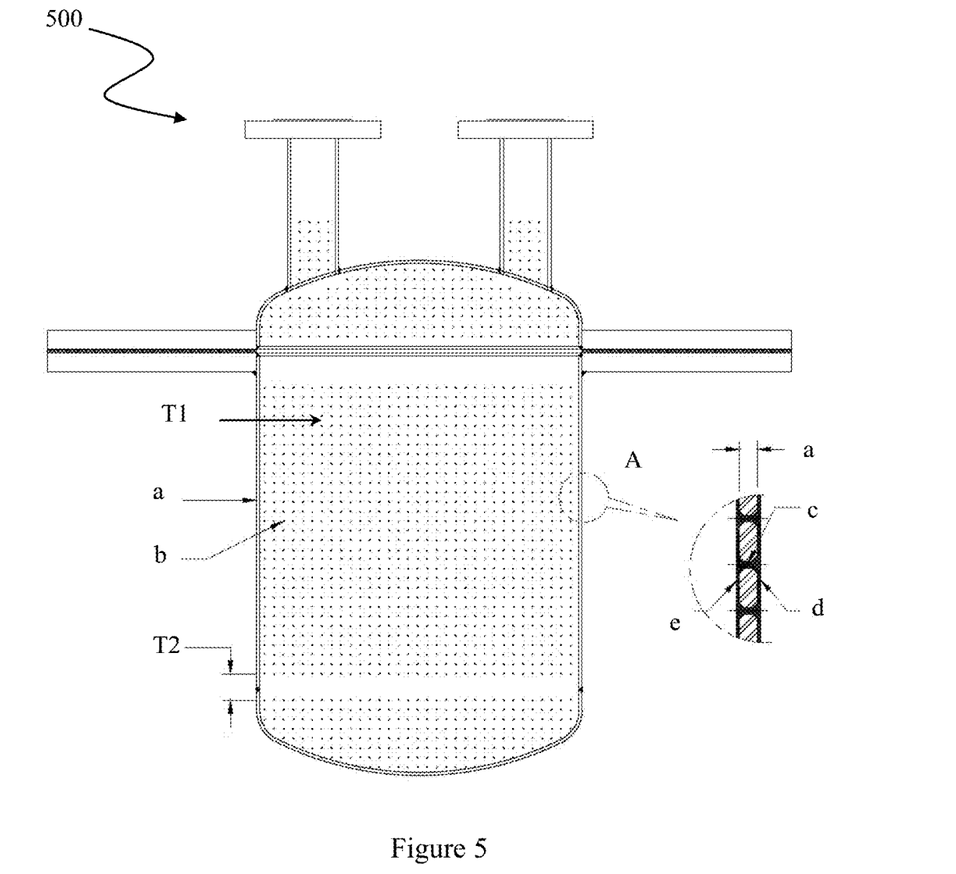
FIG. 5 illustrates the effect of bromine storage on a PFA coated tank having area with holes and without holes.

Experiment-3: Study of Resistance to Delamination of an Article Prepared in Accordance with the Present Disclosure A stainless steel storage tank (500) having a capacity of 25 liters (300 mm diameter×392 mm height) was used in this Experiment, as illustrated in FIG. 5. Stainless steel (a) having a thickness of 3 mm was used for fabricating the tank. Through holes were formed on the walls of the tank (T1). The holes (b) had a diameter of 1.25 to 1.5 mm at 9 mm pitch. A PFA coating (Dupont's Teflon PFA) was applied on the inside and the outside surface of the tank. The thickness of the coating on the inside layer of the tank was 800 microns and the coating on the outside layer of the tank was 400 microns. The inside layer and the outside layer of the coatings in the perforations were connected by the formation of contiguous ties (c), as illustrated in the blown-up image (A), wherein (d) represents the first operative surface and (e) represents the second operative surface of the tank wall. Teflon PFA coating was also applied to an area (25 mm) of the same tank without perforations (T2). The tank was filled with 9 liters of pure bromine liquid and was closed with a Teflon coated cover and allowed to stand at ambient temperature (35° C.) for 6 months.

At the end of 6 months, the bromine liquid was drained out from the tank. It was observed in case of (T1), bromine had started to permeate through the PFA layer and some quantity had accumulated behind the PFA layer. However, the PFA layer on the inside layer where the contiguous ties were present, had stayed with the body of the tank (did not delaminate) and had not formed large bubbles. Similarly, the bromine liquid had also started to permeate through the PFA layer in the portion where there were no holes (T2). In this portion the coating became unstuck from the stainless steel surface and the formation of large bubbles was observed.

Bromine is a liquid with high vapour pressure and is highly permeable through the fluoropolymers. It is observed that over a period of six months, bromine did permeate through the coating applied on the inside layer of the tank (T1). Under the normal circumstances (surface without holes, as seen in case of T2), the coating had lost the adhesion from the entire surface and had formed a bubble as a result of delamination. However, the contiguous ties had kept the film intact and delamination did not occur. Hence, the formation of the contiguous ties via the holes, results in enhanced resistance to delamination.

It is clearly seen from the experiments 1 to 3 that articles prepared in accordance with the process of the present disclosure exhibit enhanced resistance to delamination as compared to articles prepared by the conventional process.

Technical Advancements

The present disclosure described herein above has several technical advantages including, but not limited to, the realization of a method for enhancing resistance to delamination of a coating layer applied to a rigid, monolithic substrate, which results in increased life of an article and coating thereon.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

We claim:

1. A method for enhancing resistance to delamination of coating layers applied to an inner surface and an outer surface of a wall of a rigid walled article selected from group consisting of a tank, a reactor and a tube, said method comprising the following steps:

forming a plurality of holes through said wall to define through passages between said inner surface and said outer surface; and applying a first coating material on said inner surface to obtain a first coating layer, and applying a second coating material on the said outer surface to obtain a second coating layer, while a portion of said first coating material and/or said second coating material is configured to flow through said passages and configure contiguous ties between said first coating layer and said second coating layer, wherein the contiguous ties secure the first and the second coating layers to each other and resist the delamination of the first and second coating layers from the inner and outer surfaces of the wall of said rigid walled article;

wherein said first and second coating layers independently have a dry film thickness in the range of 100 μm to 2000 μm; and wherein said first coating material and said second coating material are fluoropolymers independently selected from the group consisting of perfluoroalkoxy resin, tetrafluoroethylene, ethylene tetrafluoroethylene, ethylene chlorotrifluoroethylene, polyvinylidene fluoride, polychlorotrifluoroethylene, and fluorinated ethylene propylene copolymers.

2. The method as claimed in claim 1, wherein said holes are uniformly dispersed throughout the wall of said rigid walled article.

3. The method as claimed in claim 1, wherein said holes are randomly dispersed throughout the wall of said rigid walled article.

4. The method as claimed in claim 1, wherein said first coating material and said second coating material are same.

5. The method as claimed in claim 1, wherein said first coating material and said second coating material are different.

6. A rigid walled article selected from a group consisting of a tank, a reactor, and a tube comprising:

a wall having an inner surface and an outer surface;

a plurality of holes formed on said wall of said rigid walled article to define through passages between said inner surface and said outer surface;

a first coating material applied onto said inner surface of said wall; and a second coating material applied onto said outer surface of said wall, wherein the said first coating material and said second coating material form a first coating layer and a second coating layer, respectively, while a portion of said first coating material and/or said second coating material is configured to flow through said passages and configure contiguous ties between said first coating layer and said second coating layer;

wherein the contiguous ties secure the first and the second coating layers and resist the delamination of the first and second coating layers from the inner and outer surfaces of said wall of said rigid walled article wherein said first and second coating layers independently have a dry film thickness in the range of 100 μm to 2000 μm; and wherein said first coating material and said second coating material are fluoropolymers independently selected from the group consisting of perfluoroalkoxy resin, tetrafluoroethylene, ethylene tetrafluoroethylene, ethylene chlorotrifluoroethylene, polyvinylidene fluoride, polychlorotrifluoroethylene, and fluorinated ethylene propylene copolymers.

7. The method as claimed in claim 1, wherein the steps of applying a first coating material to obtain the first coating layer and applying a second coating material to obtain the second coating layer involve spraying the first coating material onto the inner surface and spraying the second coating material onto the outer layer respectively.

8. The method as claim in claim 1, wherein the wall of a rigid walled article is a single layer monolithic substrate.

* * * * *